United States Patent
Zheng et al.

(10) Patent No.: US 6,495,184 B1
(45) Date of Patent: Dec. 17, 2002

(54) GRILLED MEAT FLAVORING COMPOSITION AND METHOD OF PREPARATION

(75) Inventors: Yan Zheng, Cordova, TN (US); Stephen S. Williams, Cordova, TN (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/975,070

(22) Filed: Oct. 12, 2001

(51) Int. Cl.$^7$ .................................................. A23L 2/56
(52) U.S. Cl. ........................ 426/533; 426/534; 426/535; 426/650
(58) Field of Search ................................ 426/533, 534, 426/535, 536, 537, 538, 601, 656, 657, 658, 650, 651

(56) References Cited

U.S. PATENT DOCUMENTS

| | | |
|---|---|---|
| 3,645,754 A | 2/1972 | Wiener |
| 4,144,357 A | 3/1979 | Mohammed |
| 4,165,391 A | 8/1979 | Corbett nee Rolison |
| 4,169,901 A * | 10/1979 | Kravis .................. 426/601 |
| 4,218,487 A * | 8/1980 | Jaeggi ................... 426/533 |
| 4,571,342 A | 2/1986 | DiCicca et al. |
| 4,592,917 A | 6/1986 | Tandy |
| 4,604,290 A | 8/1986 | Lee et al. |
| 4,820,538 A | 4/1989 | Schulman et al. |
| 4,865,868 A | 9/1989 | Kuss |
| 4,879,130 A * | 11/1989 | Heyland et al. ............ 426/533 |
| 5,039,543 A | 8/1991 | Lee et al. |
| 5,045,335 A | 9/1991 | De Rooij et al. |
| 5,104,672 A | 4/1992 | Chen et al. |
| 5,158,795 A | 10/1992 | Chen et al. |
| 5,496,579 A | 3/1996 | Weigandt et al. |
| 5,780,089 A | 7/1998 | Lee |
| 5,811,149 A | 9/1998 | Chen et al. |
| 5,952,029 A | 9/1999 | Freel |

FOREIGN PATENT DOCUMENTS

JP            60-30663         2/1985

* cited by examiner

*Primary Examiner*—Leslie Wong
(74) *Attorney, Agent, or Firm*—Larson & Taylor, PLC

(57) ABSTRACT

A meat flavoring composition is prepared utilizing a flavorant obtained by heating a fat in the presence of oxygen for a time and temperature sufficient for the fat to develop the charcoal broiled flavor. The flavorant is combined with an amino acid source and reducing sugar in a fat medium to form a low moisture content mixture which is then heated for a time and temperature sufficient to produce a Maillard reaction.

18 Claims, 2 Drawing Sheets

GRILLED MEAT FLAVORING COMPOSITION AND METHOD OF PREPARATION

FIELD OF THE INVENTION

The present invention relates to a process for preparing a meat flavoring composition and, more particularly, to a thermal process wherein amino acids and reducing sugars are combined in an oil environment to produce a meat flavoring composition having a grilled flavor and aroma.

BACKGROUND OF THE INVENTION

One of the main types of reactions for generating a meat-like flavor and aroma is the Maillard reaction in which nitrogen containing compounds, such as amino compounds and reducing sugars are reacted. In the past, development of meat flavor based on amino acids/protein and reducing sugars was focused on aqueous systems such as those disclosed in U.S. Pat. Nos. 5,039,543 and 4,592,917. The methods taught in these patents produce flavors which can be characterized as brothy, or freshly cooked.

While the protein/amino acids and reducing sugars in a meat product produce the meat flavor, it is also known that oil/fat, which degrades to produce fatty acids, aldehydes and ketones, gives meat a species-specific flavor.

Thus, another prior art method for preparing meat flavoring agents, such as that disclosed in U.S. Pat. No. 4,604,290, utilizes lipid components. The flavor profile of the products produced using this method may be described as having a brothy, stewed, little roast, or well-cooked character.

U.S. Pat. No. 4,571,342 discloses a flavoring composition wherein charred meaty notes are obtained by subjecting a film of fat or oil to high temperature. To enhance the meaty notes, precursors such as sulfur containing vegetables, sulfur containing amino acids, ascorbic acid, and yeast are used in the oil. The mixture is subjected to a precooking process before removing the solids. The precursor oil is then subjected to the high temperature treatment. The solids content used in the precooking step is less than 10% and no solids are present in the product after the high heat treatment. Hence the meaty notes of the product are mainly limited to the aroma rather than taste.

U.S. Pat. No. 5,158,795 discloses a flavoring composition which the inventors maintain is distinctly different from that of U.S. Pat. No. 4,571,342. The flavoring composition is prepared by distilling a fat or oil starting material which is in the form of a liquid pool wherein the heating may be carried out at a temperature from 300° to 475° C. for prolonged periods in a special batch type apparatus.

Accordingly, it is an object of the present invention to provide a method of preparing a grilled meat flavoring composition which resembles the cooking environment of baking, roasting and grilling and facilitates the formation of a roasted, broiled or grilled meat flavor.

It is another object of the invention to provide a meat flavoring composition that can be used in sauce preparation, meat marination applications and other food processing to enhance the meat flavor and taste in the finished product without the need to subject the finished product to high heat and time intensive thermal processes such as roasting and grilling.

SUMMARY OF THE INVENTION

The foregoing and other objects, which will be apparent to those of ordinary skill in the art, are achieved in accordance with the invention by providing a meat flavoring composition prepared by obtaining a flavorant prepared by heating a fat for a time and temperature sufficient for the fat to develop a charcoal broiled flavor; combining the flavorant with an amino acid source and a reducing sugar in a fat medium to form a mixture containing less than 5% moisture; and heating the mixture for a time and temperature sufficient to produce a Maillard reaction.

In a preferred embodiment, the mixture is pre-heated to a temperature of 65 to 95° C. and held at this temperature for 30 to 60 minutes. The mixture is then heated to a temperature of 100 to 160° C. and held at this temperature for a period of 5 to 300 minutes. If the initial mixture has a moisture content of less than 3%, this first heating step may be omitted. The mixture is then cooled to a temperature of 35 to 40° C. The mixture is continuously agitated during both heating and cooling steps.

Preferably, the mixture which is heated to produce the meat flavoring composition includes 0.5 to 5% by weight of the amino acid source, 0.5 to 5% by weight of the reducing sugar and 45 to 80% by weight of the fat medium based on total weight of the composition.

BRIEF DESCRIPTION OF THE DRAWINGS

The present invention will now be further illustrated by way of example with reference to the accompanying drawings wherein.

DETAILED DESCRIPTION OF THE PREFERRED EMBODIMENTS

Figure 1:
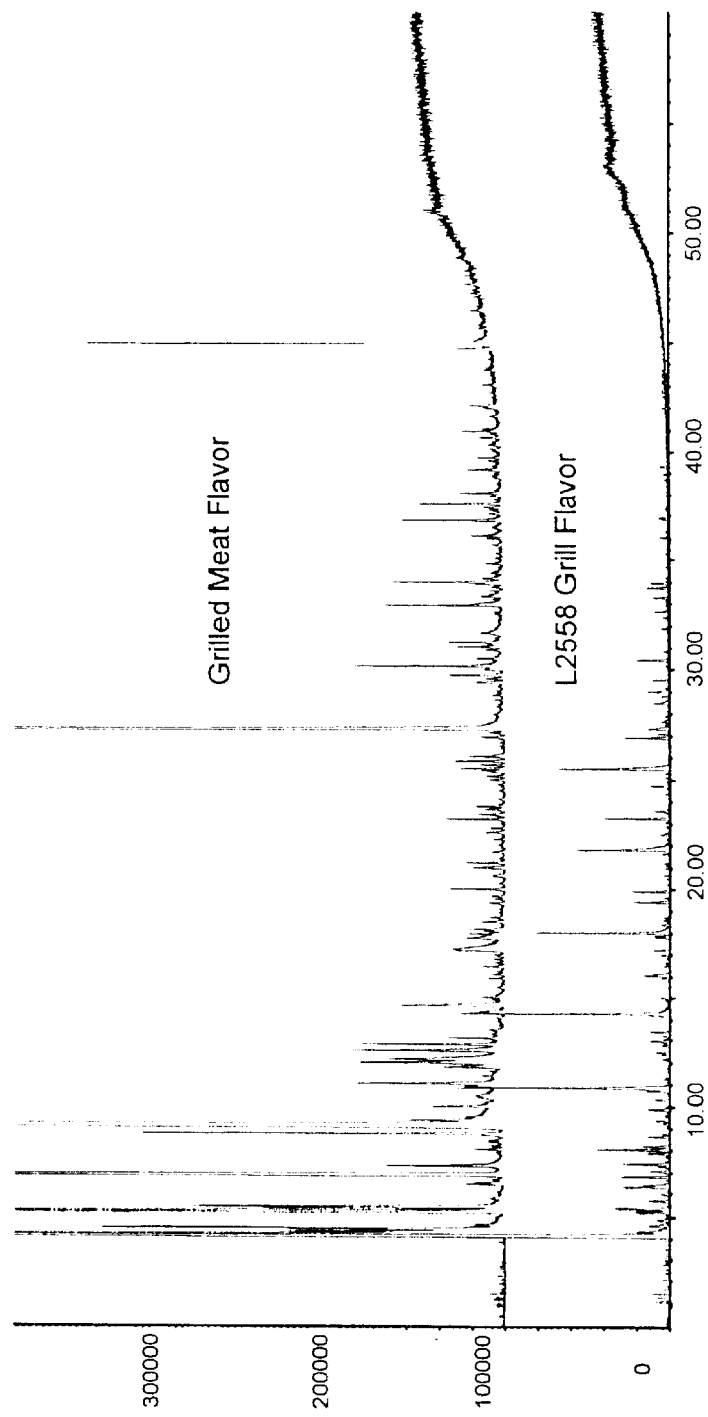
FIG. 1 shows total ion chromatograms of the grilled meat flavor of the invention and commercially available Grill Flavor® L2558, manufactured by Kraft Food Ingredients Corporation of Memphis, Tenn.

According to the invention, a meat flavoring composition is prepared by first obtaining a flavorant prepared by heating a fat for a time and temperature sufficient for the fat to develop a charcoal broiled flavor. Suitable methods are disclosed in U.S. Pat. No. 4,820,538 to Schulman et al. and U.S. Pat. No. 4,571,342 to DiCicca et al., which are herein incorporated by reference. In the DiCicca et al. patent, a film of fat or oil is subjected to temperatures within the range of 302 to 887° C. in the presence of oxygen for a time effective to develop charcoal or charred meaty flavor notes. Schulman et al. disclose exposing a thin film of fat or oil to a temperature of at least 315° C. for less than 2 minutes to exothermically heat the fat to at least 343° C. and then rapidly cooling the resultant flavorant to a temperature of less than 104° C. Preferably the fat is heated in the presence of oxygen. A commercially available product which can be utilized as the flavorant for the present invention is Spray-Dried Natural Grill Flavor® which is manufactured by Kraft Food Ingredients Corporation of Memphis, Tenn. In fact, any one of the Grill Flavor® products in either Dry or Liquid form can be incorporated.

Alternatively the flavorant may be a grilled flavor composition produced in accordance with the teachings of U.S. Pat. No. 5,952,029 to Barry A. Freel assigned to Ensyn Technologies, Inc. This patent discloses a fast pyrolysis reaction whereby a spray of saturated or partially saturated vegetable oil is heated to a temperature of at least 480° C. in an oxygen starved atmosphere followed by rapidly quenching the pyrolysis products.

The flavorant may be left in liquid form or dried to form a powder. The flavorant is then combined with an amino acid source and a reducing sugar in a fat medium to form a mixture. The total solids content of the mixture is at least 20% of the total weight of the mixture and approximately half of the weight of the fat medium to ensure a high flavor strength in both aroma and taste of the resultant meat flavoring composition. Preferably, the total solids content of the mixture is between 25 and 40% of the total weight of the mixture.

The amino acid source may be a single amino acid which is specifically associated with the desired meat flavoring composition, a mixture of various amino acids or a protein hydrolysate. Sulfur-containing amino acids such as cysteine, cystine, methionine, glutathione, 2-amino-ethane sulfonic acid or their salts, and the like, are preferred. The reducing sugar may be a mono-, di-, or oligo-saccharide, such as xylose, fructose, etc.

The fat medium is an animal fat or vegetable fat. Suitable animal fats include beef fat, chicken fat or fish oil. The vegetable fat is typically a vegetable oil fatty ester shortening composition selected from vegetable oils including oleic acid oils, linolenic acid oils and erucic acid oils, such as cottonseed oil, peanut oil, sesame seed oil, corn oil, soybean oil, safflower oil, sunflower seed oil, rapeseed oil and other edible oilseed oils, and mixtures thereof. In addition, the term vegetable oil fatty ester shortening compositions as used herein includes oils such as polyol fatty acid esters including polyglycerol fatty acid esters and sugar fatty acid esters. The specific fat medium utilized will vary the character of the resultant meat flavoring composition. For example, oleic acid is preferred for achieving a strong beef-like character, while linoleic acid provides a roasted chicken or fish character.

It is important that the mixture of flavorant, amino acid source and reducing sugar in a fat medium contains a moisture content less than 5% (moisture is defined as free water plus moisture present in the reactants). A higher moisture content will produce a final flavoring composition that is characterized by flavor descriptors such as stewed, brothy and/or boiled. These types of flavor profiles are not compatible with the desired meat flavoring composition of the present invention. Preferably the mixture should contain less than 3% moisture thereby eliminating the need for a preheating step. Most preferably the moisture level should be restricted to only the amount of moisture present in the ingredients which should be less than 1%.

In addition, flavor may be enhanced by addition of a yeast autolysate or a yeast hydrolysate. The yeast autolysate or yeast hydrolysate is generally used in an amount ranging from about 0 to 35%, more preferably 10–35%, by weight, based on total weight of the mixture. In the preferred method of the invention, an autolyzed yeast extract is utilized. Liquid, paste or powder forms of the autolyzed yeast extract are commercially available through:

a) Burns Philip Food Ingredients, 35 Adams North., Hutchinson, Minn. 55350;
 b) Red Star Bio Products, 433 E. Michigan St., Milwaukee, Wis. 53202;
 c) FIS, 30575 Bainbridge Rd., Solon, Ohio 44139-2205; and
 d) DSM Food Specialties.

In the preferred embodiment, the mixture includes the following proportions of components given in percent by weight of the total composition: 5 to 35% flavorant, 0.5 to 5% amino acid, 0.5 to 5% reducing sugar, 45 to 80% fat medium, and 10 to 35% autolyzed yeast extract.

The resultant mixture is heated for a time and temperature sufficient to produce a Maillard reaction. Heating of the mixture is typically conducted in two stages, the mixture being agitated throughout the heating process. The mixture is first preheated to a temperature of 65 to 95° C. and then held at this temperature for 30 to 60 minutes. This first heating stage is a conditioning step which maintains a uniform suspension of the solid particles in the fat medium to prevent the particles from melting and lumping together during reaction at a higher temperature in the second heating stage. The lumping of solid particles can cause separation of the particles from the fat medium creating processing problems which result in a different flavor profile of the product.

The mixture is then heated in a second stage to a temperature of 100 to 160° C. and held for a period of 5 to 300 minutes. Heating is preferably conducted in a batch type, open or closed reaction vessel, such as a jacketed tank equipped with an agitator. Test results have shown that the flavor profile of a product made at oxygen starving conditions (i.e., a closed system with headspace purged with inert gas) is the same as that of a product made in an open kettle.

In the preferred embodiment wherein moisture content of the reaction mixture is less than 3%, the first heating stage may be omitted and only the second stage heating step is required. The mixture is finally cooled with continued agitation to a temperature of 35 to 40° C. and then transferred to a high shear mixer where the mixture is blended at high speed at least 2500 rpm for 5 to 30 minutes.

The resultant meat flavoring composition may further be blended with thickener, extenders, or carriers such as maltodextrin, gum arabic, etc. Additional flavor enhancers such as spices, monosodium glutamate and the like, as well as pigments and dyes may also be added. These additives may be combined with the mixture prior to or after the reaction, although the latter is preferred. The meat flavoring composition is then packaged and stored at refrigeration temperatures. Where a liquid vegetable oil is utilized, the composition may be dried, typically by spray drying prior to packaging. Alternatively, the composition may be immediately combined with other ingredients to form the final food product, such as a sauce, gravy, etc.

The resultant meat flavoring composition is useful in any food product wherein it is desired to have a grilled flavor including marinades, sauces, soups, gravies, meats, seasonings, spreads, etc. The amount of flavorant to be added to a given food is dependent on the application. Typically, about 0.1 to 5.0% by weight, preferably 1 to 3% by weight will provide the desired flavoring and aroma. The meat flavoring composition enhances the meat flavor and taste in the food product thereby eliminating the need to subject the finished product to high heat and lengthy thermal processes such as roasting and grilling.

The invention is described by reference to the following examples:

EXAMPLE 1

A meat flavoring composition was prepared using the following ingredients:

| Ingredients | % by weight |
| --- | --- |
| Vegetable Shortening | 50.0 |
| Grill Flavor ® L2558* | 12.5 |
| Autolyzed Yeast Extract | 33.0 |

-continued

| Ingredients | % by weight |
|---|---|
| Cysteine HCl | 1.0 |
| Proline | 0.5 |
| Fructose | 2.0 |
| Oleic Acid | 1.0 |
| | 100.0 |

*Liquid Natural Grill Flavor ®, Kosher L2558

Procedure

All ingredients were mixed in a stainless steel container.

The mixture was heated to 70±5° C. with agitation and held at this temperature for 30 minutes.

Heating was continued with agitation until the temperature of the mixture reached 120±5° C.

The mixture was held at 120±5° C. and allowed to react for 30 minutes.

After reaction was complete, the mixture was cooled to 35–40° C. while agitation continued.

The product was transferred to a blender and blended at high speed for 1 minute.

The mixture was packaged and stored at refrigeration temperature.

The flavor was tested by applying it to foods before or after cooking. The flavor imparted charcoal broiled, meaty flavor to the food.

EXAMPLE 2

A flavor was prepared according to Example 1 except for use of liquid vegetable oil instead of vegetable shortening. The flavor was then spray dried at 50% on a modified food starch with 2% tricalcium phosphate as anti-caking agent. The powdered flavor was then used at 1% in a gravy consisting of 5.3% wheat flour, 3.0% oil, 0.4% salt and 91.3% whole milk. The flavor imparted a smooth oven roasted, meaty flavor to the gravy. The flavor was also tested by applying it to foods before or after cooking to impart a charcoal broiled, meaty flavor to the food.

EXAMPLE 3

Samples of the grilled meat flavor of the invention and commercially available Grill Flavor® L2558 were compared using a gas chromatograph (GC). The following samples were prepared: (1) 1.0 g of the grilled meat flavor made in Example 1 and (2) 0.125 g of Grill Flavor® L2558. The samples were separately sealed in 22 ml headspace vials. After the samples were subjected to 180° C. for 20 minutes, one ml of volatiles in the headspace was sampled and analyzed using a HP 6890 GC with a HP 5973 MSD (Hewlett-Packard, Palo Alto, Calif.). Separation was carried out on a Stabilwax column (60 m×0.25 mm×0.5 $\mu$m, Restek Corp, Bellefonte, Pa.). Oven temperature was increased from 40° C. to 240° C. at a rate of 4° C./min and then held at 240° C. for 10 minutes.

The analytical results shown in FIG. 1 reveal major differences in volatile composition between the grilled meat flavor of the invention and Grill Flavor® L2558. A total of 65 peaks were detected in the grilled meat flavor and only 23 peaks in Grill Flavor® L2558, demonstrating that the grilled meat flavor of the invention is more complex.

EXAMPLE 4

Figure 2:
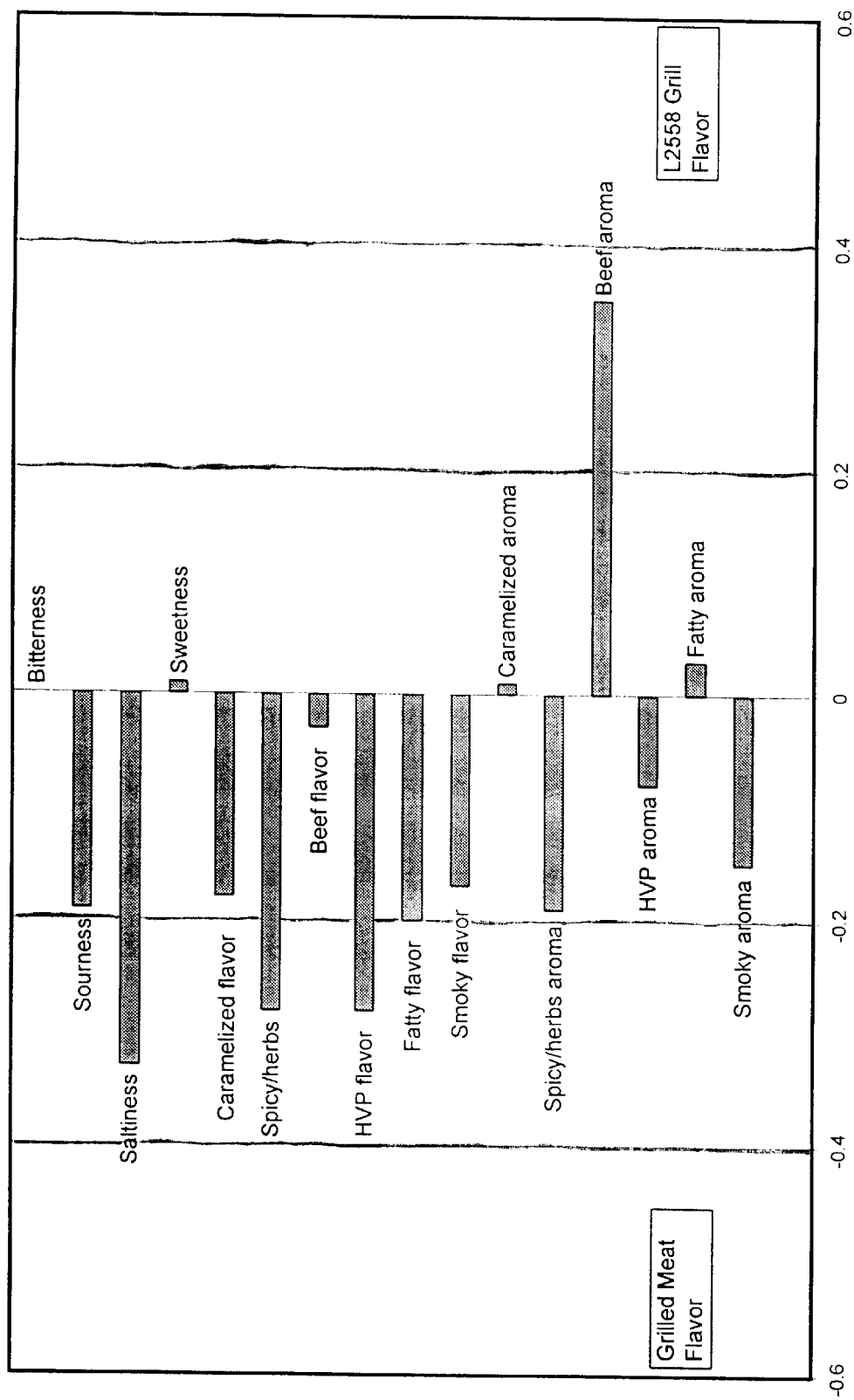
FIG. 2 shows a sensory comparison between the grilled meat flavor of the invention and Grill Flavor® L2558.

Quantitative Descriptive Sensory Analysis was used to better understand the sensory differences between the grilled meat flavor of the invention and the commercially available Grill Flavor® L2558. A sample of the flavor made in Example 1 was spray dried onto a carbohydrate carrier and then incorporated into a beef burger. A liquid Grill Flavor® L2558 was also incorporated into a beef burger. Samples were cooked and evaluated on 16 attributes by a panel consisting of 12 trained panelists in three replicates. The mean of 36 independent measurements for each attribute was obtained using hedonic scaling and then compared. Results in FIG. 2 show the difference between grilled meat flavor of the invention and Grill Flavor® L2558 in each attribute evaluated. Of 16 attributes evaluated, 11 attributes were perceived stronger in the grilled meat flavor of the invention. The other four attributes were stronger in Grill Flavor® L2558. The degree of the differences also varies from attribute to attribute. However, a bigger difference for a particular attribute such as saltiness or beef aroma does not mean the attribute predominates in the flavor. These differences in sensory results again confirm that the grilled meat flavor of the invention is different from Grill Flavor®L2558.

We claim:

1. A process for preparing a meat flavoring composition comprising:

obtaining a flavorant prepared by heating a fat for a time and temperature sufficient for the fat to develop a charcoal broiled flavor;

combining said flavorant with an amino acid source and a reducing sugar in a fat medium to form a mixture containing a moisture content less than 5%; and heating said mixture for a time and temperature sufficient to produce a Maillard reaction.

2. The process according to claim 1 wherein said step of heating comprises heating said mixture to a temperature of 100 to 160° C. and holding said mixture at said temperature for a period of 5 to 300 minutes.

3. The process according to claim 2 further comprising pre-heating said mixture before said step of heating to a temperature of 65 to 95° C. and holding said mixture at 65–95° C. for 30 to 60 minutes.

4. The process according to claim 2 further comprising cooling said mixture after heating to a temperature of 35 to 40° C.

5. The process according to claim 4 further comprising blending the mixture at high speed for 5 to 30 minutes.

6. The process according to claim 1 wherein said step of combining further comprises adding a yeast autolysate or a yeast hydrolysate.

7. The process according to claim 1 wherein total solids content of the mixture is at least 20% of total weight of the mixture.

8. The process according to claim 7 wherein the total solids content of the mixture is between 25 and 40% of the total weight of the mixture.

9. The process according to claim 1 wherein total solids content of the mixture is approximately half of the weight of the fat medium.

10. The process according to claim 1 wherein the mixture comprises: 5 to 35% by weight of said flavorant, 0.5 to 5% by weight of said amino acid source, 0.5 to 5% by weight of said reducing sugar and 45 to 80% by weight of said fat medium based on total weight of the mixture.

11. The process of claim 10 wherein the mixture further comprises yeast autolysate or yeast hydrolysate in an amount of from 0 to 35% by weight based upon the total weight of the mixture.

12. The process according to claim 10 wherein said amino acid source comprises at least one sulfur-containing amino acid.

13. A process for preparing a meat flavoring composition comprising:

obtaining a flavorant prepared by heating a fat for a time and temperature sufficient for the fat to develop a charcoal broiled flavor;

combining said flavorant with an amino acid source, a reducing sugar and an autolyzed yeast extract in a fat medium to obtain a mixture containing less than 5% moisture and comprising 5 to 35% by weight of said flavorant, 0.5 to 5% by weight of said amino acid source, 0.5 to 50% by weight of said reducing sugar, and 45 to 80% by weight of said fat medium based on total weight of said mixture;

heating said mixture to a temperature of 100 to 160° C. and holding said mixture at 100 to 160° C. for a period of 5 to 300 minutes; and cooling said mixture to a temperature of 35 to 40° C., said mixture being agitated during said steps of heating and cooling.

14. The process according to claim 13 further comprising pre-heating said mixture before said step of heating to a temperature of 65 to 95° C. and holding said mixture at said temperature of 65–95° C. for 30 to 60 minutes.

15. The process according to claim 13 wherein said mixture has a solids content of at least 20% of total weight of said mixture.

16. The process according to claim 13 wherein the mixture additionally comprises yeast autolysate or yeast hydrolysate in an amount of from 10 to 35% by weight based upon the total weight of the mixture.

17. The process according to claim 13 wherein the moisture content of the mixture is less than 3%.

18. The process according to claim 13 wherein the fat medium comprises vegetable oil or vegetable shortening.

\* \* \* \* \*